Sept. 22, 1964 T. D. COE 3,149,666

COOLER

Filed June 15, 1961 2 Sheets-Sheet 1

INVENTOR.
Thomas D. Coe
BY
Ezekiel, Wolf, Wolf & Greenfield
ATTORNEYS

Sept. 22, 1964 T. D. COE 3,149,666
COOLER
Filed June 15, 1961 2 Sheets-Sheet 2
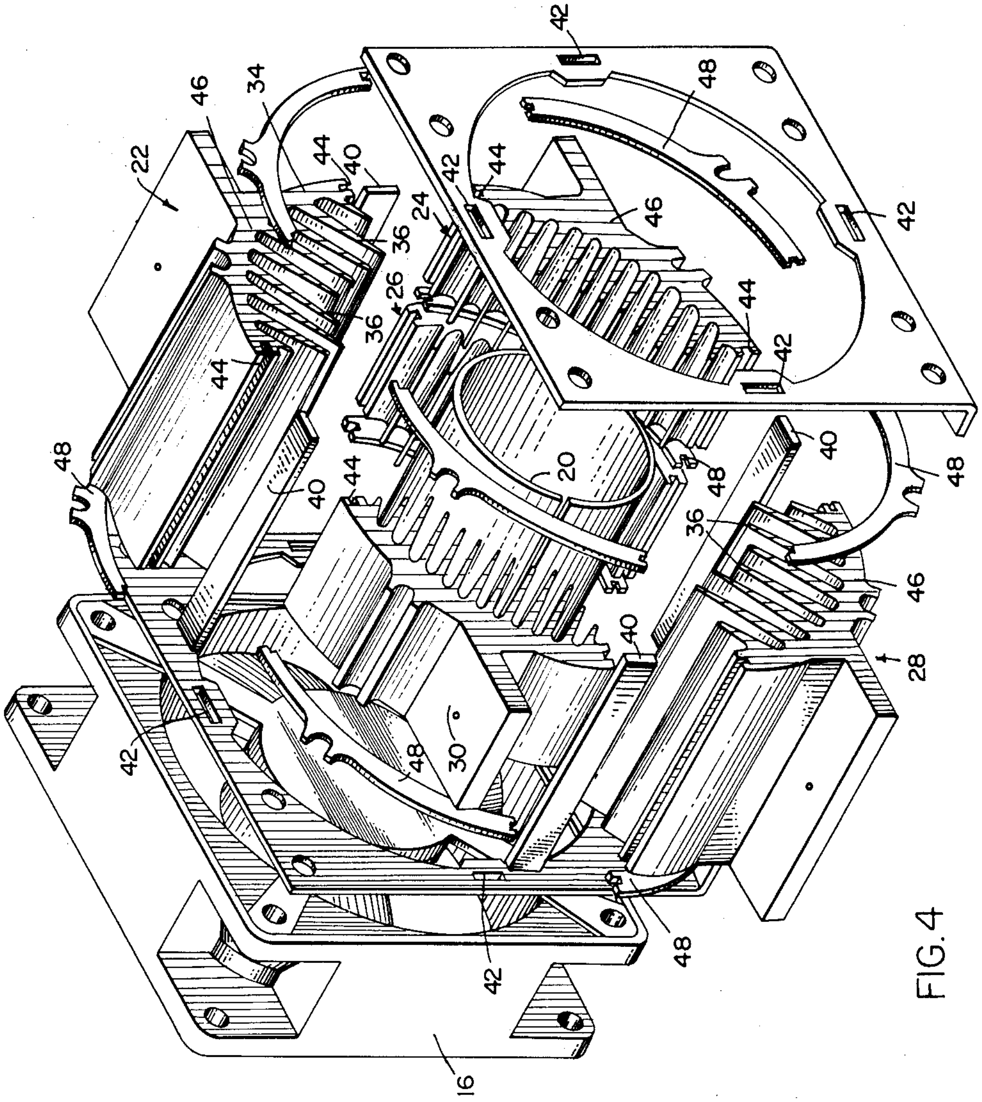
FIG. 4
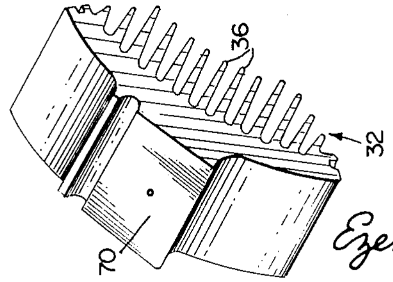
INVENTOR.
Thomas D. Coe
BY
Ezekiel Wolf, Wolf & Greenfield
ATTORNEYS 3,149,666
COOLER Thomas D. Coe, Winchester, Mass., assignor to Wakefield Engineering, Inc., Wakefield, Mass., a corporation of Massachusetts Filed June 15, 1961, Ser. No. 117,367
17 Claims. (Cl. 165—121)

This invention relates to cooling devices and more particularly comprises a new and improved cooling package for semiconductors.

Since the development of semiconductors and other related electronic power devices, the ancillary apparatus required to cool such devices rather than the devices themselves constitute the limiting factor in the size miniaturization of much electronic circuitry.

The primary object of this invention is to maximize the cooling efficiency of cooling devices of a given volume and blower capacity, thus to enable the use of smaller cooling devices to achieve certain temperature conditions.

Another important object of this invention is to minimize the fabrication cost of high efficiency cooling devices.

Another important object of this invention is to provide a modular cooling device which may be tailored to a wide range of applications.

Still another important object of this invention is to provide a multi-station cooling device which insures uniform flow of coolant to each of the different stations.

The assembly of parts which make up an embodiment of the cooler comprises a number of thermally conductive elements oriented about means defining an inner wall, such as a tube. A support or platform for carrying a semiconductor device is in thermal contact with at least one element. In a preferred form the thermally conductive elements include an arcuate plate concentric with the tube and a plurality of generally parallel fins between the plate and the tube. The arcuate plates and the inner tube define a flow path which is annular in section for a stream of fluid to carry heat from the fins and thereby cool the devices.

The structural feature of generally parallel fins extending between the outer arcuate plate and the inner tube affords a number of advantages. The inner tube and outer plate cooperate to confine the flow of heat withdrawing fluid to a region filled with heat radiating fins, thereby maximizing the ratio of heat withdrawn by the fluid to the volume of fluid flowing past a given cross sectional plane in a specified time interval. The generally parallel fins permit the fluid to flow across the entire length of each plate with uniform velocity and provide uniform fin cooling with a minimum of turbulence. Each element may be like the others and extruded from material, such as aluminum, to reduce fabrication costs. A number of elements may be cascaded angularly about and axially along the inner tube to provide virtually any desired cooling capacity.

Still another feature of the invention resides in providing a fan having its blades immediately adjacent to the annular region defined by the inner tube and outer arcuate plates with its motor predominantly within a region coextensive with the volume surrounded by the inner tube. This arrangement most efficiently converts the energy driving the fan motor into the mechanical energy of the fluid coolant flowing over the cooling fins. Each of the sectors of the device may be made up of one or more members electrically insulated from one another, that is, the sector-shaped members may be made in different lengths so that more than one member may be mounted in the same sector about the tube. This affords the user a wide choice of applications for the device.

These and other objects, advantages and features of this invention will be better understood and appreciated from the following detailed description of one embodiment thereof, selected for purposes of illustration and shown in the accompanying drawing, wherein:

FIG. 4 is an exploded view of the cooling device.

Figures 1, 2, 3:
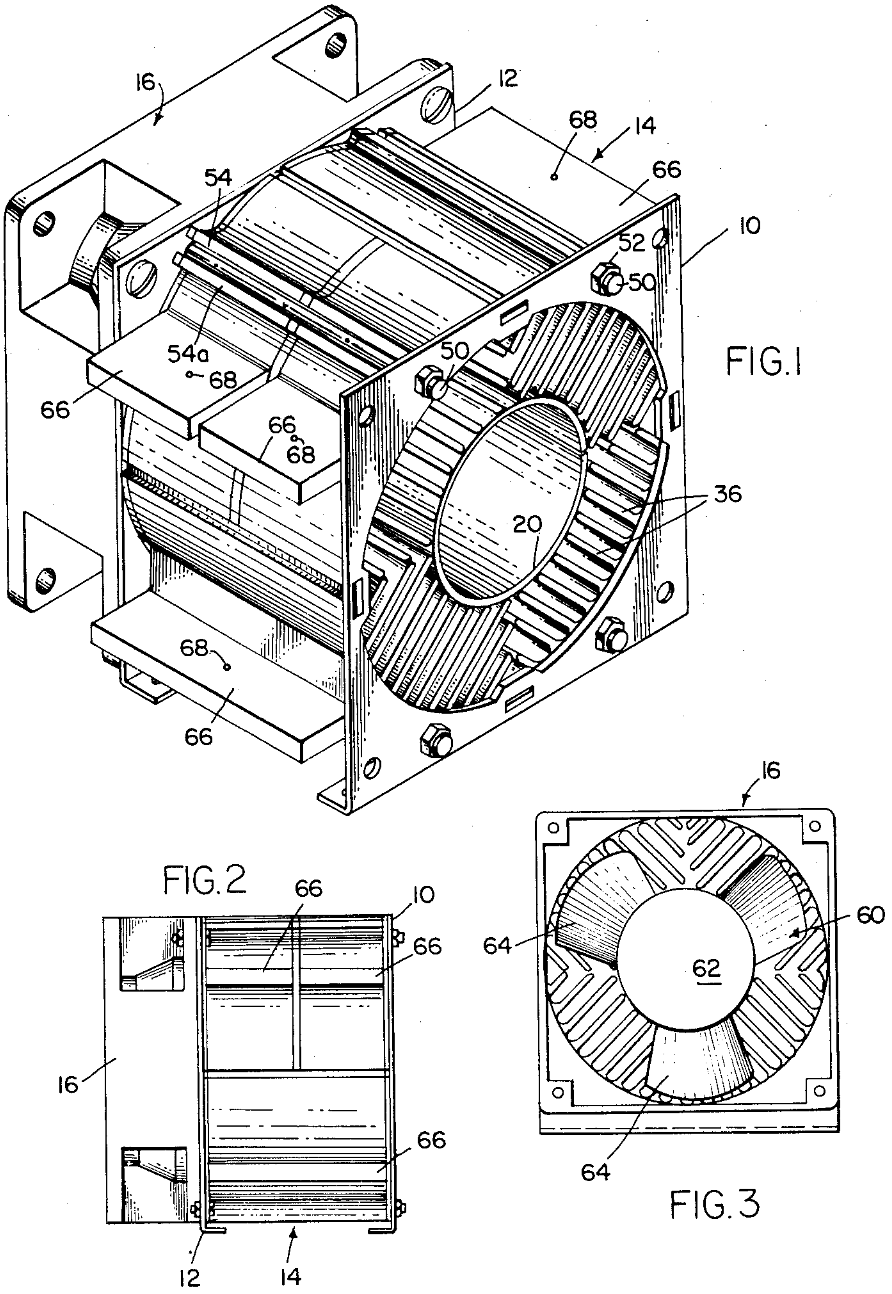
FIG. 1 is a view in perspective of a cooling device embodying this invention.
FIG. 2 is a side view of the cooling device shown in FIG. 1.
FIG. 3 is a rear view of the cooling device shown in FIG. 1.

The embodiment of this invention shown in the drawing includes in its general organization a pair of end plates 10 and 12 between which are mounted the assembly of parts that constitute the air directors and semiconductor supports designated generally at 14. A blower assembly 16 is secured to the outer surface of end plate 12.

The air directors and semiconductor supports assembly is organized about a central tube 20 made of electrical insulating material and which extends between the end plates 10 and 12. Surrounding the tube 20 are a plurality of members of sectorial cross section 22, 24, 26, 28, 30 and 32 which have virtually the same cross sections. Each fills one quadrant of the cross-sectional area of the cooler. Each of the members has a constant cross section throughout its length to facilitate fabrication by a relatively inexpensive extrusion process. In FIG. 4, sectorial members 22 and 28 are literally identical, as are members 24 and 30. Member 26, not fully visible in FIG. 4, may be the same as member 32. The several sectorial members include an arcuate plate 34 of approximately 90° and a plurality of parallel fins 36.

While the best mode now contemplated for practicing the invention incorporates elements embracing a sector bounded by radii emanating from the assembly axis of substantially 90°, the elements may embrace sectors of other angles within the principles of the invention. It should also be noted that while the geometry of circularly symmetrical inner and outer walls separated by the heat radiating fins possesses certain advantages, the principles of the invention may be incorporated in structures exhibiting different geometry. The fins of the respective sectorial member are disposed parallel to a plane which bisects the sector occupied by each member and are also parallel to the axis of the tube 20. In FIG. 1 it will be noted that one or more of the fins 36 disposed adjacent the side edges of the sectorial members do not reach the surface of the tube 20 but rather terminate short of it and align themselves with similar fins at the edges of adjacent sectorial members.

In FIGS. 1 and 4 it will be noted that sectorial members 22 and 28 extend substantially the full distance between the end plates 10 and 12 while the other quadrants of the device are each occupied by two sectorial members, each substantially equal in length to one-half the length of the members 22 and 28. In FIG. 4 for purposes of clarity one of the shorter sectorial members 32 has been removed from the position which it normally occupies with respect to the other members of the assembly.

The several sectors are separated about the device by insulating strips 40. Each of the strips is anchored at its ends in slots 42 provided in the end plates 10 and 12, and the side edges of the strips engage channels 44 formed in the edges of the arcuate plates 34. The channels 44 have a depth somewhat less than one-half the width of the strips 40 so that the edges of the channels of two adjacent sectorial members do not touch one another. The four strips 40 not only serve to electrically isolate the several quadrants of the device, but further aid in retaining the sectorial members in their assembled positions.

Disposed against the flat ends 46 of the arcuate plates 34 of the sectorial members are gaskets 48 which serve to electrically insulate the sectorial members from the end plates 10 and 12 and from adjacent members in the same quadrant. Thus, the gasket 48' shown in FIG. 4 serves to electrically insulate sectorial members 24 and 26.

The sectorial members and the several gaskets 48 are retained in their assembled relationship shown in FIG. 1 by threaded studs 50 and nuts 52. The several sectorial members and the gaskets are each provided with adjacent ribs 54 which define a seat on the outer surface of the arcuate plates 34 for the studs so that the members and gaskets may not twist about the axis of the assembly. Each of the studs is surrounded by a sleeve (not shown) made of electrical insulating material to prevent the studs from forming an electrical connection between the end plates and the sectorial members.

The blower and housing 16 are attached to the plate 12 by nuts and bolts as suggested in FIG. 2. The fan or blower 60 within the housing includes a central motor 62 and a plurality of blades 64. The motor 62 has a diameter substantially equal to that of the tube 20 and when the housing 16 is secured to the plate 12 the motor serves to close one end of the tube. The blades 64 are aligned with the annular passage between the tube 20 and the arcuate plates 34 of the several sectorial members. The fan, when driving, directs air through the annular passage and over the surfaces of the several fins 36.

In the drawings it will be noted that platforms or supports 66 form an integral part of each of the sectorial members and that each is provided with a small hole 68 at its center. The platforms or supports 66 are provided to carry the semiconductor devices to be cooled by the invention. A screw or some form of pin may be anchored in the hole to attach the semiconductor device into intimate heat conducting relationship to the support.

In FIG. 4 the sectorial member 32 is shown to be provided with a different form of support 70. The support 70 will retain a semiconductor device in a somewhat better heat conducting relationship to the rest of the assembly since it is positioned closer to the cooling medium directed through the annular passage by the fan or blower 60.

The construction of the cooler described above provides a low cost, compact modular package offering low thermal resistance to the transfer of heat from the semiconductor device to a fluid coolant. Motor 62 at the hub of the fan eliminates a fluid passage remote from the fins so that all the fluid driven by the fan flows over the fins to maximize cooling efficiency. Because each of the supports or platforms 66 and 70 may be electrically isolated from one another by means of the insulating strips 40 and gaskets 48, the invention may cool devices in electrically isolated circuits. Furthermore, the basic configuration may be modified readily to increase or decrease the number of semiconductor device supports in the package by substituting sectorial members of different lengths. Thus, by substituting for the sectorial member 22 two members of the design of member 30, the capacity of the invention is increased. Most of the parts which make up the assembly may be fabricated either by extruding or punching, two relatively inexpensive manufacturing methods. The sectorial members may readily be extruded from aluminum or an aluminum alloy which is a relatively low cost and good heat conducting material. The end plates may be made of an aluminum alloy and be punched from sheets very economically. The gaskets 48 may be punched or stamped from plastic electrical insulating sheet material at a minimum cost. The efficiency of the device is relatively high as there is a maximum utilization of the coolant. The several fins hasten the dissipation of heat from the semiconductors and the nature of the shape of the passages through which the coolant is directed results in maximizing the cooling effect.

Numerous modifications of and departures from the specific embodiments described herein may be practiced by those skilled in the art without departing from the inventive concepts. Consequently, the invention is to be construed as limited only by the spirit and scope of the appended claims.

What is claimed is:

1. A cooler comprising a tube, four quadrant-shaped members of material of high thermal conductivity each extending about one quarter of the tube and including an arcuate plate and having a plurality of fins each parallel to a radius intersecting the midportion of the arcuate plate and extending the length of the plate, means for retaining the quadrant-shaped members about the tube, supports secured to the arcuate plates for carrying a semiconductor device, said arcuate plates coacting with said tube to define an annular volume therebetween containing said fins, and means for directing a coolant through said annular volume.

2. A cooler comprising means defining an inner wall surrounding an axis, a plurality of sectorial members of material of high thermal conductivity secured about the inner wall, each member having an outer plate disposed generally parallel to the inner wall and having a plurality of fins each parallel to the plane bisecting the sector about the inner wall embraced by the member, said outer plates coacting with said inner wall to define an annular volume therebetween containing said fins, and means for directing a coolant stream through said annular volume in a direction generally parallel to said axis.

3. A cooler as defined in claim 2 further characterized by a platform of material of high thermal conductivity secured to and in good thermal contact with the outer surface of the outer plates for supporting a semiconductor device to be cooled.

4. A cooler as defined in claim 2 further characterized by each of the sectorial members having the same width.

5. A cooler as defined in claim 3 further characterized by means electrically insulating the sectorial members from one another.

6. A cooler comprising a tube made of electrical insulating material, a plurality of extrudable sectorial members of material of high thermal conductivity disposed about the tube and together covering the tube surface, each of said members including an outer arcuate plate disposed parallel to the tube and having integral therewith a plurality of inwardly extending fins each parallel to a radial plane bisecting the member, the inner edges of some of said fins engaging the surface of the tube, electrical insulating strips disposed between adjacent sectorial members, an end plate disposed at each end of the tube and extending radially to cover the ends of the arcuate plates, each end plate formed with openings exposing the fins, means electrically insulating the end plates from the sectorial members, a platform secured to and in good thermal contact with each of the arcuate plates adapted to support a semiconductor device to be cooled, a fan disposed adjacent one of the plates for directing air between the tube and the arcuate plates along the fins, and means retaining the several parts in their assembled relationship.

7. A cooler as defined in claim 6 further characterized by some of said sectorial members being aligned axially with respect to the tube, and means electrically insulating the axially aligned sectorial members.

8. A cooler as defined in claim 6 further characterized by each of said sectorial members having the same arcuate width.

9. Apparatus for cooling a semiconductor device comprising, an integral structure of material of high thermal conductivity embraced by a sector of an annulus between an inside circular arc, an outside circular arc and a pair of radii emanating from a common axis, said structure having an outside plate contiguous with said outside structure having an outside plate contiguous with said outside circular arc and a plurality of substantially parallel fins substantially filling the region of said sector between said outside plate and said inside circular arc, and means for supporting a semiconductor device outside said sector while establishing a path of high thermal conductivity between the semiconductor device supported thereby and said outside plate.

10. Apparatus in accordance with claim 19 and further comprising, means defining a wall along the circle comprising said circular arc, a plurality of said integral structures contiguous about said wall defining means to substantially fill said annulus with a like plurality of groups of said substantially parallel fins.

11. Apparatus in accordance with claim 10 and further comprising, a fan with its axis substantially coincident with said common axis axially displaced from but immediately adjacent to said integral structures and having a plurality of blades symmetrical about said common axis in the annular volume immediately adjacent to and an axial extension of said annulus embracing said fins, the length of each blade being substantially the radial width of said annulus and said annular volume, rotation of said blades causing a flow of coolant in a direction parallel to said common axis along the surfaces of said fins through said annulus.

12. Apparatus in accordance with claim 9 and further comprising, means defining an inner wall between said axis and said outer plate immediately adjacent to at least a central group of said fins.

13. Apparatus in accordance with claim 12 wherein said outer plate and the edges of a pair of extremal groups of said fins define at least in part the perimeter of a circular sector subtended by radii emanating from said axis.

14. Apparatus in accordance with claim 13 and further comprising, a number of said elements and said inner wall fully surrounding said axis.

15. Apparatus in accordance with claim 12 and further comprising means for forcing fluid to flow between said inner wall and said outer plate across said fins.

16. Apparatus in accordance with claim 14 and further comprising, means for forcing fluid to flow between said inner wall and said outer plate across said fins.

17. Apparatus in accordance with claim 16 wherein said fluid forcing means comprises a fan having blades driven by a motor, most of said motor being in a volume coextensive with the volume surrounded by said inner wall, most of said fan blades being within a volume immediately adjacent to and coextensive with the annular volume between said inner wall and said outer plate.

References Cited in the file of this patent

UNITED STATES PATENTS

| | | |
|---|---|---|
| 2,109,279 | Soverhill | Feb. 22, 1938 |
| 2,417,315 | McCollum | Mar. 11, 1947 |
| 2,936,409 | Jackson et al. | May 10, 1960 |